United States Patent [19]

Anderson

[11] Patent Number: 4,526,408

[45] Date of Patent: Jul. 2, 1985

[54] INSULATING TUBULAR CONDUIT

[75] Inventor: David M. Anderson, Whittier, Calif.

[73] Assignee: Baker Oil Tools, Inc., Orange, Calif.

[21] Appl. No.: 399,563

[22] Filed: Jul. 19, 1982

[51] Int. Cl.³ .............................................. F16L 59/14
[52] U.S. Cl. ................................. 285/47; 285/133 R;
  285/138; 285/333; 285/286; 285/397
[58] Field of Search ............... 285/47, 53, 133 R, 138,
  285/333, 370, 397, 286

[56] References Cited

U.S. PATENT DOCUMENTS

| | | | |
|---|---|---|---|
| 1,349,518 | 8/1920 | Lyle | 285/333 X |
| 1,731,171 | 10/1929 | Miller | 285/333 X |
| 3,511,282 | 5/1970 | Willhite et al. | 138/113 |
| 3,574,357 | 4/1971 | Alexandru | 285/47 |
| 3,680,631 | 8/1972 | Allen et al. | 166/57 |
| 3,794,358 | 2/1974 | Allen et al. | 285/47 |
| 4,396,211 | 8/1983 | McStravick et al. | 285/47 |

FOREIGN PATENT DOCUMENTS 800348  8/1958  United Kingdom ............... 285/333

Primary Examiner—Richard J. Scanlan, Jr.
Attorney, Agent, or Firm—Norvell & Associates

[57] ABSTRACT

A concentric insulating tubular conduit member for use in forming a conduit string such as a tubing string in a subterranean oil or gas well, is disclosed. Each individual conduit comprises concentric inner and outer members rigidly attached at each end. Both the inner and outer tubular members are welded to an intermediate bushing. At least one of the inner and outer members is upset to prevent weakening of the tubular joint at the welded connection. Adjacent tubular conduits can be interconnected by couplings having an outer surface flush with the outer periphery of the two interconnected joints.

6 Claims, 2 Drawing Figures

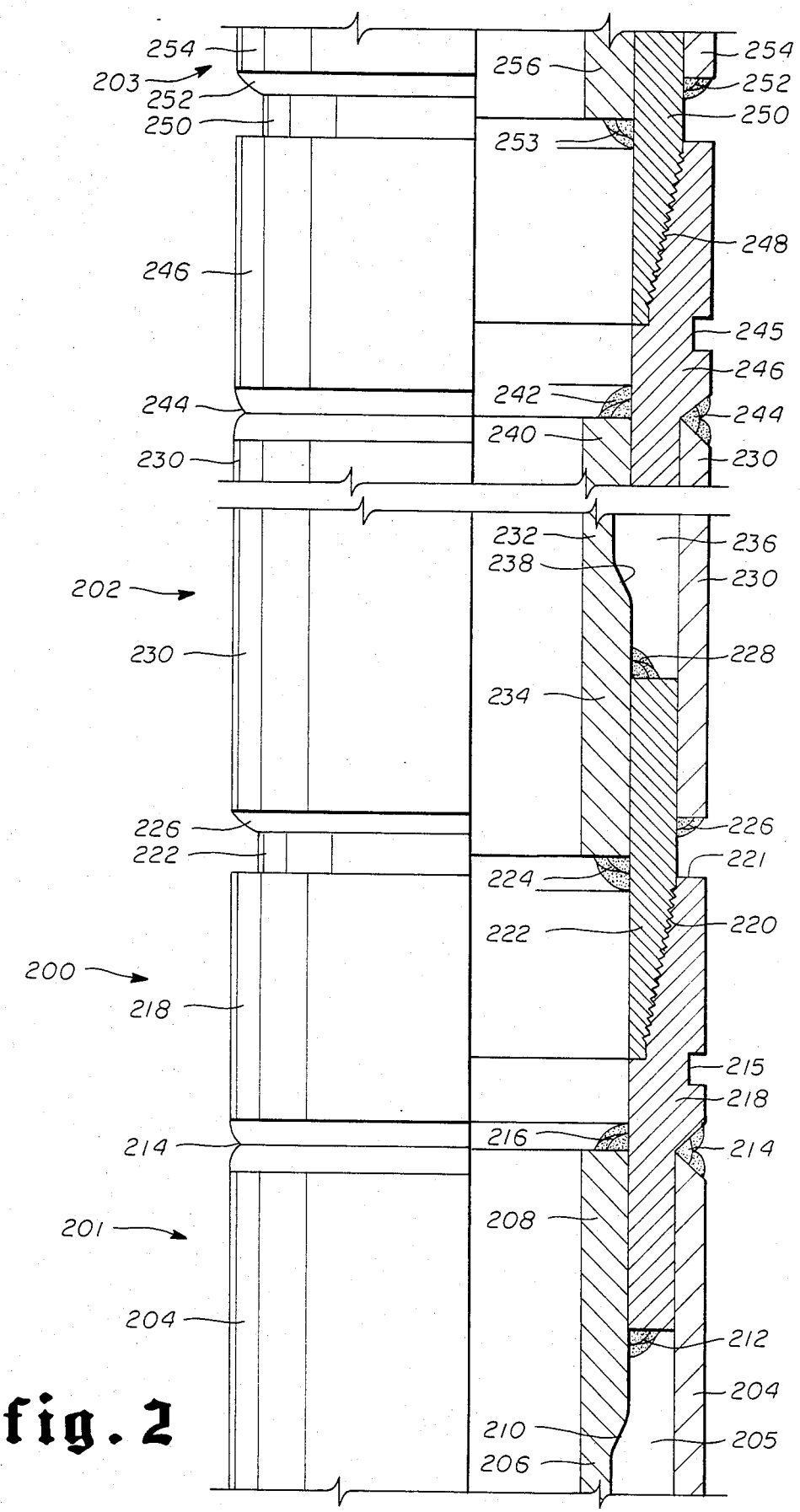

INSULATING TUBULAR CONDUIT

BACKGROUND OF THE INVENTION

1. Field of the Invention

This invention generally relates to an insulated tubular conduit and means for connecting the separate tubular conduits which has particular utility in subterranean wells.

2. Description of the Prior Art

In producing some subterranean wells, steam is injected into an injection well to increase the recovery of hydrocarbons by reducing high viscosity crude, otherwise known as "heavy crude". The lower viscosity permits the oil to flow more readily. One technique for doing this is to inject a high quantity of steam into the production zone containing "heavy crude" for an extended period of time, such as from about three to about five weeks. At that time, the viscosity of the heated crude will be reduced and it can then be pumped through a production well in communication with the production zone. The injection well may also be modified for production. A steam "flood" may also be provided by known techniques, generally through an injection well, to drive the flood and to produce hydrocarbons into a nearby production well.

One of the major problems in injecting steam into a subterranean production zone through conventional well production tubing is that the steam loses a large quantity of its heat to the well bore casing and surrounding formation as it travels to the production zone. Attempts have been made to reduce the heat loss of steam introduced in subterranean formations. One such attempt is disclosed in U.S. Pat. No. 3,511,282 issued on May 12, 1970. This patent discloses a dual wall tubular structure having insulation sealed in the annulus between the inner and outer walls by bushings respectively welded at each end between the inner wall and the outer wall. The inner wall is prestressed in tension prior to being welded to the outer wall. The space between the inner and outer walls is filled with a conventional insulating material.

Concentric walled thermal insulating conduits are also disclosed and claimed in U.S. patent application Ser. No. 264,728 filed on May 18, 1981 now abandoned and in U.S. patent application Ser. No. 272,411 filed on June 10, 1981 now U.S. Pat. No. 4,396,211. This latter patent application discloses a concentric walled tubular conduit in which the inner tubular member is flared to permit direct interconnection between the inner and outer tubular members. The inner tubular member used in the patent application 272,411 comprises a tubular member which initially has enlarged or upset ends. When the tubular member is flared with the resulting elongation of the ends, the thickness of the initially enlarged or upset sections is reduced, although the thickness still remains at least equal to the thickness of the inner tubular member intermediate to its ends. The welds between the inner and outer tubular members in concentric insulated tubing, particularly prestressed tubular conduits, are especially critical. If these welds fail the annular insulation between the inner and outer tubular conduit will be subjected to rapid deterioration, primarily due to the presence of moisture in the annulus. These wells can also be subjected to large stresses during the life of the tubular conduit string.

SUMMARY OF THE INVENTION

The insulating tubular conduit claimed herein uses a concentric inner and outer tubular members attached at either end to define an annular insulating cavity. In the preferred embodiment of this invention the inner and outer tubular members are welded at each end to intermediate bushings. At least one of the inner or outer tubular members has an enlarged upset end. In the preferred embodiment of this invention the inner tubular member has an enlarged upset end. The welded connection between the inner tubular member and the bushing is along the enlarged end portion of the tubular member. The increased thickness of the upset tubular ends insures greater integrity for the welded connection than could be achieved if the welded bushing-tubular member connection were made to a tubular member having a smaller thickness. Upsetting or enlarging the ends of tubular members is a standard practice for tubular sections used in subterranean oil and gas wells. Normally the enlarged ends are formed by forging the ends of a tubular member of initially constant thickness.

These tubular conduits can be interconnected by use of a threaded coupling member. The tubular conduit claimed herein is particularly adaptable for establishing a tubular member in which the couplings are flush with the exterior of the outer tubular members. In one embodiment of this invention the outer tubular members have internal threads. The flush coupling member has recessed external threads on opposite ends. In another embodiment the individual tubular conduits have male and female coupling members on opposite ends. Both the male and female coupling members are integral with the bushing members to which the inner and outer tubular members are rigidly attached. In both of the embodiments depicted herein a recess defined by a shoulder on the coupling permits the engagement of a tubular conduit, formed by separate inner engaged tubular sections, to be gripped and manipulated by external devices.

BRIEF DESCRIPTION OF THE DRAWINGS

FIG. 2 is a quarter-section view showing another embodiment of the same invention in which the bushings and the conduit coupling members comprise a single element on each end of the conduit.

DESCRIPTION OF THE PREFERRED EMBODIMENTS

Figure 1:
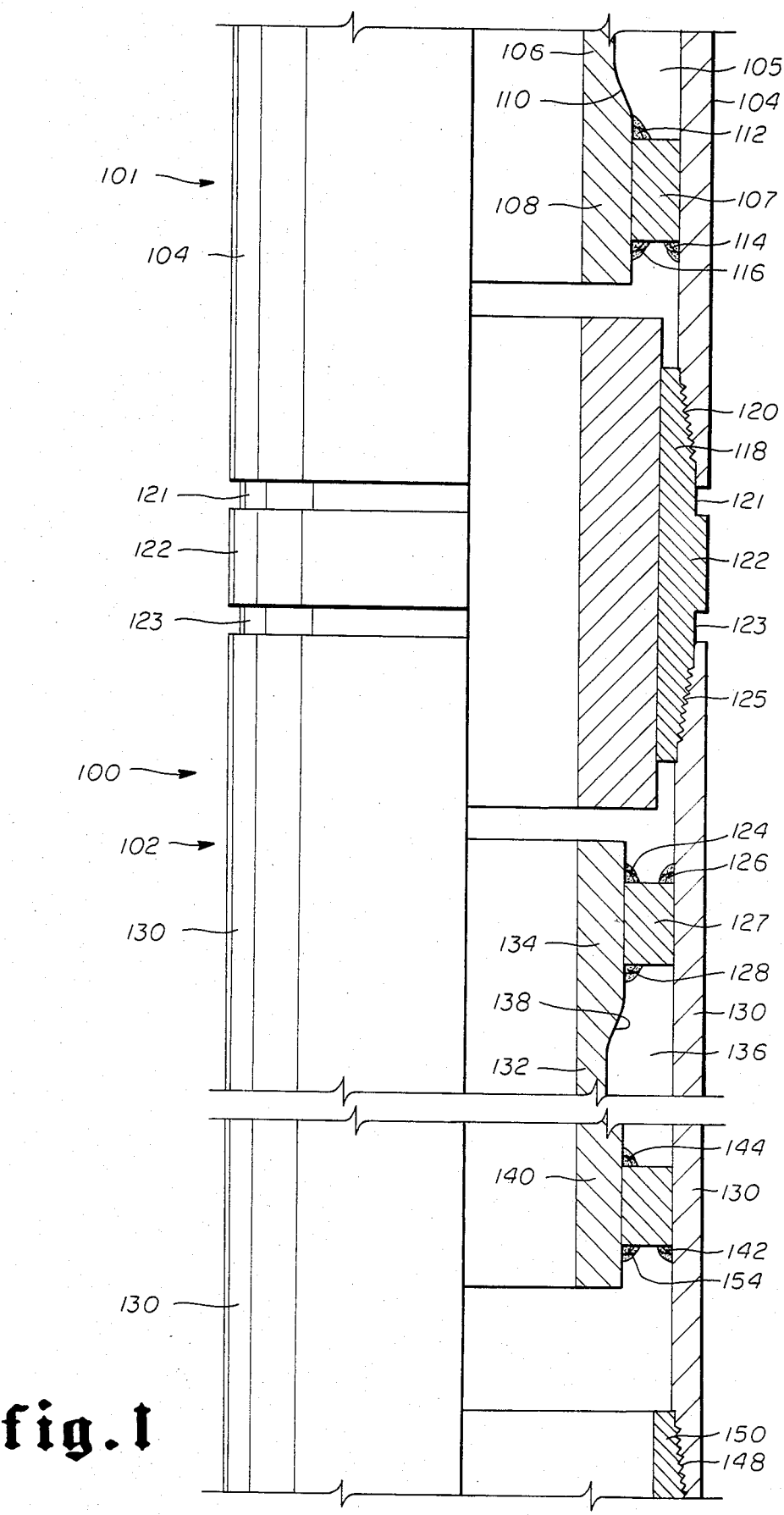
FIG. 1 is a quarter-section view showing one embodiment of the insulating tubular conduit and bushing interconnecting the inner and outer tubular member.

The two alternate embodiments of this invention are shown in FIGS. 1 and 2. Each alternate embodiment combines the use of a welded inner tubular conduit in which the welded connection is established along the upset ends of the inner tubular member. Each embodiment employs coupling means for joining separate tubular conduits to form a tubular string for use in a subterranean oil well. The coupling members on each embodiment are flush with or recessed from the exterior of the outer tubular member.

Each embodiment of this invention comprises inner and outer concentric tubular members which are joined at the opposite ends by means of a welded connection to an intermediate bushing. These concentric walled tubular conduit members are intended for use in forming a tubular string which permits the transport of heated fluid from the surface of a well to the producing formation. Normally the heated fluid will be steam which is injected into the well to lower the viscosity of the "heavy crude" in the formation. The lower viscosity oil can then be produced by this or adjacent wells.

Both FIGS. 1 and 2 illustrate the attachment of the inner and outer tubular conduits at opposite ends of the concentric walled insulating tubular conduit member. Both figures also depict the interconnection of adjacent tubular sections to form a tubular string. It should be understood that each tubular section consists of a member formed of generally conventional oilfield tubular members. As such each tubular member will have a length of approximately thirty feet, a common length for oilfield tubulars. Since the middle sections of each joint are conventional in nature only the end sections of the interconnected joints are shown. In describing the components of the two alternate embodiments, generally equivalent structures are referred to by reference numerals in which the last two digits are the same. The first digit of the three digit reference numeral refers to the embodiment of either FIG. 1 or FIG. 2 respectively.

Tubing string 100 shown in FIG. 1 consists of two identical tubular conduits 101 and 102. The interconnection between tubular conduits 101 and 102 is shown. The lower end of tubular conduit 101 comprises an outer tubular member 104 and an inner tubular member 106. Members 104 and 106 are interconnected by an intermediate bushing 107. Inner tubular conduit 106 has an enlarged upset end. Standard API tubular members often employ enlarged upset ends, and the means of f. bricating these tubular conduits is well known. Tubula having upset ends are widely used in the oil industry.

Intermediate bushing 107 comprises a cylindrical member which is welded on opposite ends to the upset section 108 of the inner tubular member 106. Bushing 107 is welded at the upper end at weld 112 and at the lower end by a similar weld 116. Welds 112 and 116 are both on the upset portion 108 of the tubing. Degradation of the inner tubing 106 due to the heat applied at the weld will in general be confined to the increased thickness in the upset end. Loss of load carrying capability of the interior tubing will thus be minimized since the unaffected thickness in the upset end will generally be at least equal to the thickness of the inner tubing intermediate its ends. Thus the bushing is adhesively bonded to the inner tubular 106 by a process which elevates the temperature of the inner tubular 106 by the addition of heat without appreciably affecting the integrity of the connection. The bushing is also welded at 114 to the exterior tubing 104 on the lower or outer end of bushing 107. Note that the adjacent end of tubular conduit 102 has a similar upset end 134 on inner tubular member 132. An intermediate bushing 127 is positioned between the upset end 134 and the exterior tubular 130. Welds 124 and 128 connect the intermediate bushing to the upset end of tubular member 134 and weld 126 connects the bushing to the outer tubular member 130.

As the concentric tubular conduits comprising the preferred embodiments of this invention are primarily intended for use to form an insulating tubular string in a subterranean well for the transportation of heated fluids in the well, the tubing will be subjected to stresses due to thermal expansion. One means of minimizing these thermal stresses which has been used on conventional insulating tubular strings is to prestress the inner tubular member in tension relative to the outer tubular member. This tensile prestress is imparted to the inner tubular member during assembly of each individual conduit. After the inner tubular member, such as upper tubular member 106, is affixed to bushings 107 at each end by means of welds 112 and 116, the inner tubular member and bushing subassembly is inserted into the outer tubular member. A bushing 107 at either end of the conduit assembly is first rigidly attached to the outer tubular member 104. In general this attachment will be by means of a weld 114. The inner tubular member is then elongated. The second bushing 107 rigidly welded to the inner tubular member 106 is then attached to the outer tubular member 104 with the inner tubular member 106 in an elongated condition. Again this attachment is preferably by means of a weld such as weld 114. The means used to elongate inner tubular member 106, for example a means to heat the inner tubular member, is then removed. The elongation in inner tubular member 106 will tend to decrease in order to remove the tensile stress within member 106. As the tension stresses are reduced in member 106, compressive stresses will be imparted to member 104. At some point an equilibrium will be established with the tensile stress in inner member 106 being balanced by the compressive stress in member 104. The use of upset tubular members on the member in prestressed tension is especially significant because it is this connection which would be subject to compressive failure. The inherent tendency of the localized addition of heat at a welded connection to reduce the load carrying capacity of a member is thus reduced by the use of upset ends such as upset end 108.

As is the case with other concentric wall insulated tubular members an annular cavity 105 has been established throughout the length of the concentric wall conduit. Material having good insulating properties is positioned within insulating cavity 105 to minimize the loss of heat from the fluids carried within the insulating tubing string. The presence of moisture within insulating cavity 105 would be detrimental to the heat transfer performance of the tubular conduit. The welds at the end of the tubular member represent the most likely path through which moisture could be introduced into insulating tubular cavities 105. The integrity of the welds between bushing 107 and the inner and outer tubular members 106 and 104 is thus important, not only from the load carrying aspect, but also to insure that unwanted moisture is not introduced in the annular insulating cavity.

Coupling 122 is used to interconnect adjacent ends of separate tubular conduits such as conduits 101 and 102. In the embodiment of FIG. 1 outer tubular members 104 and 130 both have internal threads for establishing threaded connections 120 and 125 with coupling 122. By providing the threads on the interior of the outer tubular members the coupling 122 can be positioned so that it is flush with the exterior of the outer tubular member. Note that shoulders on the central section of coupling 122 are spaced from the ends of outer tubular member 104 and 130 to define recesses 121 and 123. These recesses provide a means for gripping the tubing string formed by the inner connection of multiple tubular conduits with a flush connection. Recesses 121 and 123 thus aid in the manipulation of the tubing string.

FIG. 2 is an alternate embodiment of this same invention which also has flush couplings between adjacent conduit sections and utilizes an upset end on the tubular member placed in tension when heated fluids pass through the tubing string. The coupling members 218 and 222 on adjacent tubing sections of this second embodiment also serve as the bushing interconnecting the inner and outer tubular members. As shown in FIG. 2 tubing string 200 consists of a plurality of separate conduit sections 201, 202 and 203. Both ends of conduit section 202 are shown in FIG. 2. Note that the lower end employs a male coupling-bushing member 222 while the upper end employs a female coupling-bushing member 246. Concentrating upon the inner connection of tubing strings 201 and 202 by means of coupling member 218 and 222 it can be seen that each of the coupling members is welded directly to the end of the inner and outer conduits forming the conduit section. Conduit section 201 has an outer tubular member 204 and inner tubular member 206 which are generally equivalent to the inner and outer tubular conduits shown in the embodiment of FIG. 1. Inner conduit 206, which will normally be in prestressed tension and which will be subjected to axial loads during the operation of the tubing string has an enlarged upset end 208 which should be identical to the enlarged upset end 108 employed in FIG. 1. Note that weld 212 between coupling member 218 and inner conduit 206 is again along the enlarged upset end section 208. Weld 216 is between the coupling bushing member 218 and the free end of tubing conduit 206 and should not significantly reduce the tensile load carrying capacity of the inner tubular member. Bushing member 218 is welded to the outer tubing section by means of weld 214. The male coupling-bushing 222 attached to the upper end of conduit section 202 is similarly welded to upset end portion 234 at weld 228. The free end of the inner conduit member 232 is also welded to the coupling section 222 at 224. The coupling 222 is welded at 226 to the outer conduit section 230. Note that the outer wall of coupling 218 is again flush with the outer tubular member 204 and threads 220 provide a means of interconnecting the two conduit sections without increasing the external wall thickness of the tubing string. Coupling grooves 215 and 245 define external shoulders for manipulation of the tubulars.

Fabrication of an individual conduit section such as section 202 is similar to the fabrication of a conduit section in the embodiment of FIG. 1. Note however that the female connection 246 has a thickness which is greater than the separation between inner and outer conduits 232 and 230. Thus the female connection which is initially attached to the inner conduit (note the complete attachment between coupling 218 and tubing section 206) must first be welded to one end of the outer tubular member, as at 244. The inner tubular member can then be elongated in a manner similar to that previously discussed with reference to FIG. 1. The male coupling previously attached to the opposite end of the inner tubular member 232 has a thickness equal to the separation between upset end 234 and the outer tubular conduit 230. When the inner tubular member 232 has been adequately elongated the male bushing 222 is rigidly attached to the outer tubular conduit, for example by means of the weld 226. Note that the embodiment of FIG. 2 as well as the embodiment of FIG. 1 provides a prestressed concentric tubular wall conduit in which interconnections between the bushing and the member subjected to axial stresses is made along an area of increased thickness to minimize the stresses induced in that member by the application of heat in an operation such as welding.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A concentric walled insulating tubular conduit for use in a tubular string to transport fluids in a subterranean oil well comprising:
   concentric inner and outer tubular members of substantially the same length;
   enlarged upset portions on the inner tubular member, formed by forging the ends of a tubular member of initially constant thickness to form upset ends of greater thickness than the intermediate portions thereof;
   an annular coupling bushing sealingly secured to each end of said concentric inner and outer tubular members, said annular coupling bushing having a spacer portion disposed radially between the upset portion of the inner tubular member and the inner wall portion of the outer tubular member to isolate the space between said inner and outer tubular members;
   said spacer portion being adhesively bonded at elevated temperatures to both said inner tubular member and said outer tubular member while said inner tubular member is prestressed in tension.

2. The tubular conduit of claim 1 wherein each bushing is welded to both the inner and outer tubular members.

3. The tubular conduit of claim 1 wherein one said bushing defines an external thread axially exterior of the adjacent end of said concentric inner and outer tubular members and the other said bushing defines an internal thread axially exterior of the adjacent other end of said concentric inner and outer tubular members, whereby said bushings may be interconnected with a mating bushing on an adjacent tubular conduit.

4. The tubular conduit of claim 1 wherein each bushing is welded to the outer tubular member.

5. The tubular conduit of claim 4 wherein each bushing is threaded for interconnection with a mating bushing on an adjacent tubular conduit.

6. A concentric walled insulating tubular conduit for forming a tubular string in a subterranean well to transport a heated fluid between the surface of the well and a subterranean location while minimizing the heat loss from the heated fluid during transport, comprising:
   an outer tubular member;
   an inner tubular member;
   a first coupling welded to the end of the inner and welded to the end of the outer tubular members at one end thereof and having a more threaded connection;
   a second coupling, matable with the first coupling, welded to the end of the inner and welded to the end of the outer tubular members at the opposite end thereof, the second coupling being flush with the exterior of the outer tubular member, and having a female threaded connection;
   an annular cavity defined between the inner and outer tubular members, the welds between the couplings and each end of the inner and outer tubular member sealing the annular cavity;
   whereby the coupling joining the inner and outer tubular sections also join adjacent tubular conduits to form a tubular string.

* * * * *